(12) United States Patent
Kapur et al.

(10) Patent No.: US 10,643,205 B2
(45) Date of Patent: May 5, 2020

(54) SYSTEM AND METHOD FOR FUNDS TRANSFER PROCESSING

(71) Applicant: MTS Holdings, Inc., Purchase, NY (US)

(72) Inventors: Shashi Kapur, Fort Lauderdale, FL (US); Ralph A. Bianco, Lagrangeville, NY (US)

(73) Assignee: MTS Holdings, Inc., Purchase, NY (US)

( * ) Notice: Subject to any disclaimer, the term of this patent is extended or adjusted under 35 U.S.C. 154(b) by 1012 days.

(21) Appl. No.: 14/416,814

(22) PCT Filed: Jul. 23, 2013

(86) PCT No.: PCT/US2013/051692
§ 371 (c)(1),
(2) Date: Jan. 23, 2015

(87) PCT Pub. No.: WO2014/018537
PCT Pub. Date: Jan. 30, 2014

(65) Prior Publication Data
US 2015/0206138 A1    Jul. 23, 2015

Related U.S. Application Data

(63) Continuation of application No. 13/556,704, filed on Jul. 24, 2012, now abandoned.

(51) Int. Cl.
*G06K 7/00*      (2006.01)
*G06Q 20/40*    (2012.01)
*G06Q 20/10*    (2012.01)
*G06Q 20/16*    (2012.01)

(52) U.S. Cl.
CPC ............ *G06Q 20/40* (2013.01); *G06Q 20/10* (2013.01); *G06Q 20/16* (2013.01); *G06Q 20/4012* (2013.01)

(58) Field of Classification Search
USPC .................. 235/375, 379, 380; 705/5, 35–45
See application file for complete search history.

(56) References Cited

U.S. PATENT DOCUMENTS

2007/0257103 A1* 11/2007 Fisher .................... G06Q 20/24
                                                                          235/380
2011/0184840 A1*  7/2011 Godard .................. G06Q 20/40
                                                                          705/30
2014/0012763 A1*  1/2014 Madden ............... G06Q 20/401
                                                                          705/71

* cited by examiner

*Primary Examiner* — Matthew Mikels
(74) *Attorney, Agent, or Firm* — Toering Patents PLLC

(57) ABSTRACT

A system and method for processing lending transactions that may facilitate prompt transfer of funds (for example, loan funds) to an individual in a secure manner. An adaptive payment server may receive first identification information, second identification information, and a request for a fund transfer. The adaptive payment server may determine an account associated with the first identification information. The adaptive payment server may authenticate identification of the account based on the second identification information. The adaptive payment server may initiate a deposit of a fund amount associated with the request into the identified account, wherein the fund amount is deposited substantially immediately after the identified account has been authenticated.

6 Claims, 7 Drawing Sheets

SYSTEM AND METHOD FOR FUNDS TRANSFER PROCESSING

RELATED APPLICATIONS

The present application claims priority to U.S. patent application Ser. No. 13/556,704 filed on Jul. 24, 2012. The contents of the aforementioned application are incorporated by reference in their entirety.

FIELD OF THE INVENTION

The invention relates generally to processing fund transfer transactions, and in particular to processing fund transfer transactions substantially in real-time after multi-factor authentication of account information.

BACKGROUND OF THE INVENTION

In a traditional model, individuals request funds, such as payday loan funds, by visiting a payday lending store. A payday loan fund is a small, short-term loan that is intended to cover a borrower's expenses until his or her next payday. A lender provides the short-term unsecured loan to be repaid at the borrower's next pay day. Typically, the borrower writes a postdated check to the lender in the full amount of the loan plus fees. On the maturity date, the borrower is expected to return to the store to repay the loan in person. If the borrower does not repay the loan in person, the lender may redeem the check.

Currently, it may take several days for the requested loan funds to be transferred to the borrower's financial account such as a checking or savings account. For example, a loan check deposit or an automated clearinghouse ("ACH") transfer may take too long. This is undesirable because typically a borrower requesting the loan funds is usually in need for these funds fairly quickly. Furthermore, the borrower and his/her account need to be properly identified and authenticated to ensure that the funds are securely transferred. Other problems such as walking out of the payday lender store with cash may be undesirable.

Conventional systems suffer from these and other problems.

SUMMARY OF THE INVENTION

According to various implementations of the invention, various systems and methods may address these and other drawbacks of existing systems. According to various implementations of the invention, various systems and methods may process fund transfer transactions, for example, lending transactions. The systems and methods may process the lending transactions by receiving a request for a loan fund amount (for example, payday loan fund amount) from a user, first identification information such as, for example, a payment card (e.g., credit card, or debit card) number associated with the user, and second identification information such as, for example, a personal identification number (PIN) for the payment card. An account such as, for example, a bank account associated with the first identification information may be determined. Identification of the account may be authenticated based on the second identification information. A deposit of the requested loan fund amount may be initiated into the identified account. The requested loan fund amount may be deposited substantially immediately after the identified account is authenticated.

Thus, an individual requesting loan funds (for example, a payday loan funds) does not have to face a significant delay in receiving these funds. Also, while the individual's identity may be verified by the first identification information he/she provides (at a payday lending store, for example), the individual's second identification information (which is not provided at the lending store) may be used to ensure that the funds are transferred to the account associated with the individual. The second identification information may be received by calling the individual via an automated Interactive Voice Response ("IVR") system. In this manner, the lending transaction remains secure because the first identification information and the second identification information are separately provided.

Other objects and advantages of the invention will be apparent to those skilled in the art based on the following drawings and detailed description.

DETAILED DESCRIPTION

According to various implementations of the invention, various systems and methods for processing funds transfer transactions may facilitate prompt transfer of requested funds to a requester in a secure manner. A requester may be a person or entity who desires to receive funds from a fund provider. In some implementations, the funds transfer transaction may include a lending transaction, wherein a borrower (i.e., requester) may receive requested loan funds (for example, payday loan funds, auto loan funds, mortgage loan funds, student loan funds, and/or other types of loan funds) from a lender (i.e., fund provider). In some implementations, the funds transfer transaction may include an insurance claim transaction, rebate transaction, pawn transaction, aid transaction associated with the government or other private agency (for example, FEMA-Federal Emergency Management Agency, Red Cross, etc.), and/or any transaction involving transfer of funds to a borrower/requester.

Figure 1:
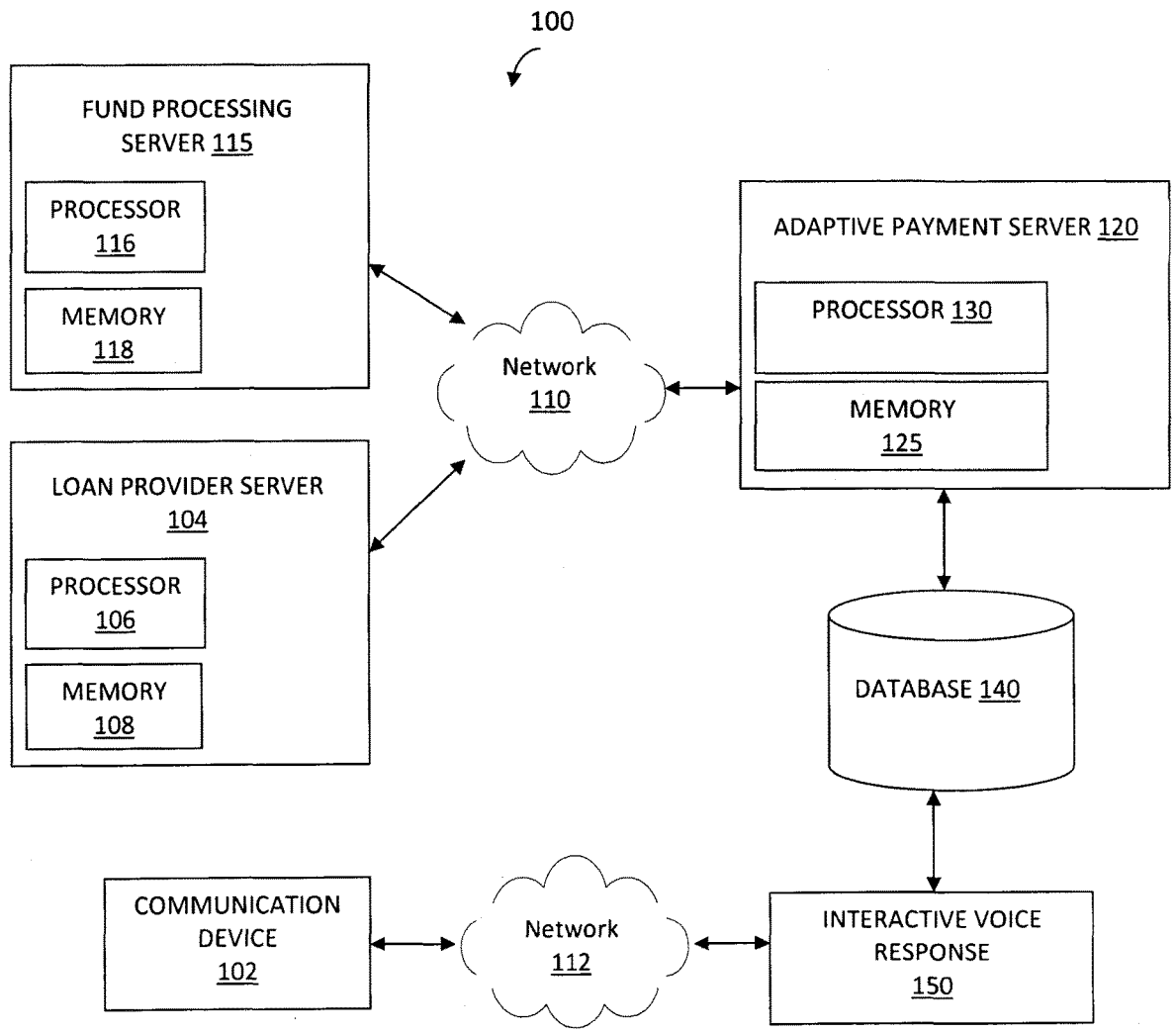
FIG. 1 is a block diagram illustrating an example of a system for processing fund transfer transactions, according to various implementations of the invention.

FIG. 1 is a block diagram illustrating an example of a system 100 for processing fund transfer transactions (for example, lending transactions) according to various implementations of the invention. System 100 may include, for example, a communication device 102, a loan provider server 104, a network 110, a network 112, a fund processing server 115, an adaptive payment server 120, a database 140, an IVR 150, and a hardware security module (HSM) 160.

According to various implementations of the invention, adaptive payment server 120 may receive a request for a fund transfer. In some implementations, the request may include an amount associated with the fund transfer. In some implementations, adaptive payment server 120 may receive the request from a fund provider, fund processing server 115 associated with the fund provider, and/or other entity. For example, in case of a pawn transaction, a pawn debtor may desire to receive funds from a pawn broker. Adaptive payment server 120 may receive a request for a fund transfer from a pawn broker wherein the request may include an amount of funds to be transferred to a pawn debtor.

According to various implementations of the invention, adaptive payment server 120 may receive first identification information. In some implementations, first identification information may include, among other things, a credit card number, a debit card number, a name of the cardholder (such as a name of a requester of funds), a telephone number of the cardholder, a mailing address of the cardholder, and/or other information related to the fund transfer transaction.

In some implementations, the first identification information may be received from a fund provider/fund processing server 115. In some implementations, the requester may provide the first identification while applying for the fund (online, via a telephone call, and/or via other communication mechanisms). In some implementations, the requester may provide the first identification information such as, for example, a payment card number by swiping the payment card at a magnetic swipe card reader provided at a brick and mortar store associated with the fund provider. In some implementations, the first identification information may be used to verify the identity of the requester requesting the funds from the fund provider. In some implementations, adaptive payment server 120 may receive the first identification information from fund processing server 115 associated with the fund provider via network 110.

According to various implementations of the invention, adaptive payment server 120 may receive second identification information. In some implementations, using the first identification information, adaptive payment server 120 may identify communication device 102. For example, in some implementations, the first identification information may include a telephone number of communication device 102, thereby identifying communication device 102. According to various implementations of the invention, adaptive payment server 120 may query database 140 to identify communication device 102 based on the first identification information.

In some implementations, adaptive payment server 120 may use or otherwise interface with IVR 150 in order to initiate a communication with communication device 102. IVR 150 may initiate a communication to communication device 102 via network 112. Once the communication is established, IVR 150 may prompt for and receive the second identification information from communication device 102. The second identification information may include, among other things, a predefined secret. The predefined secret may include, for example, a password, PIN, and/or other secret.

According to various implementations of the invention, examples of communication device 102 may include any one or more of, for instance, a personal computer, portable computer, personal digital assistant (PDA), workstation, web-enabled mobile telephone, WAP device, web-to-voice device, or other device. In other words, communication device 102 may include a data (or Internet) function configured to communicate data via network 112. In this manner, a requester or other entity may use communication device 102 to apply for a fund and/or communicate the first identification information and/or second identification information. The requester is a person or other entity that is a payment cardholder, a user using the system to request/apply for a fund from a fund provider/fund processing server 115, and/or other person or entity using the system to process a fund transfer transaction. Those having skill in the art will appreciate that the invention described herein may work with various system configurations.

According to various implementations of the invention, adaptive payment server 120 may determine an account associated with the first identification information. In some implementations, the account may include a bank account, a credit and/or debit account, and/or other account associated with the requester (hereinafter, "requester account"). According to various implementations of the invention, adaptive payment server 120 may query database 140 to identify the requester account based on the first identification information.

In some implementations, the requester account may be associated with a payment card, which may include, among other things, a credit card, a debit card, and/or other device that may be used to facilitate a fund transfer transaction. According to various implementations of the invention, the payment card may include a magnetic strip, a smart chip, near-field device, and/or other tangible media configured to store the first identification information and/or other information.

According to various implementations of the invention, adaptive payment server 120 may authenticate identification of the requester account based on the second identification information. In other words, based on the received second identification information (e.g., PIN information), adaptive payment server 120 may ensure that the requester account belongs to the requester. In some implementations, adaptive payment server 120 may communicate with the requester's bank to verify that the second identification information is associated with the requester account. In some implementations, adaptive payment server 120 may query database 140 to retrieve the second identification information stored therein and compare the stored second identification information with the received second identification information. In other words, database 140 may have the second identification information stored therein (prior to receiving information from the requester via IVR 150) which may be compared to the second identification information received via IVR 150. In response to a match, adaptive payment server 120 may determine that the requester account belongs to the borrower (i.e., identify the borrower account as being authentic).

According to various implementations of the invention, adaptive payment server 120 may initiate a deposit of a fund amount associated with the request for fund transfer into the identified requester account. In some implementations, the fund amount may be deposited substantially immediately after the identified requester account has been authenticated.

According to various implementations of the invention, adaptive payment server 120 may receive a request for a loan fund amount associated with a lending transaction. In some implementations, adaptive payment server 120 may receive the request for the loan fund amount from a lender, loan provider server 104 associated with the lender, and/or other entity. Various details regarding processing of fund transfer transactions are provided below with respect to lending transactions. However, it will be understood that various operations described with respect to lending transactions may apply to other types of fund transfer transactions without departing from the scope of the invention.

In some implementations, a borrower may apply for/request a loan online via a website such as a website associated with loan provider server 104. In some implementations, loan provider server 104 may host the website. In some implementations, the borrower may access the website via communication device 102. In some implementations, loan provider server 104 may process the loan to determine whether to approve the loan. In some implementations, loan provider server 104 may send a request for a loan fund amount associated with the loan to adaptive payment server 120. In some implementations, loan provider server 104 may send the request to adaptive payment server 120 upon loan approval.

In some implementations, the borrower may apply for a loan by calling a lender. In some implementations, the borrower may call a telephone number associated with the lender via communication device 102. In some implementations, the lender may utilize loan provider server 104 to process the loan to determine whether to approve the loan. In some implementations, loan provider server 104 may send a request for a loan fund amount associated with the loan to adaptive payment server 120. In some implementations, loan provider server 104 may send the request to adaptive payment server 120 upon loan approval. It will be appreciated that other communication mechanisms, for example, text messaging, VOIP (Voice over Internet Protocol), e-mail, instant messaging, etc., may be used to communicate with the lender/loan provider server 104 to apply for a loan.

In some implementations, the borrower may visit a lending store (e.g., a brick and mortar retail establishment associated with the lender) to apply for a loan. The lender may utilize loan provider server 104 to process the loan to determine whether to approve the loan. In some implementations, loan provider server 104 may send a request for a loan fund amount associated with the loan to adaptive payment server 120. In some implementations, loan provider server 104 may send the request to adaptive payment server 120 upon loan approval.

In some implementations, loan provider server 104 may generate a loan reference identifier for the requested loan. The loan reference identifier may be one or more words, characters, numbers, and/or other identifier that may identify the requested loan. Furthermore, the loan reference identifier may be written, typed, and/or spoken. In this manner, the loan reference identifier may be used to identify the requested loan to the borrower, adaptive payment server 120, and/or other entity. In some implementations, loan provider server 104 may send the loan reference identifier to adaptive payment server 120. In some implementations, loan provider server 104 may send the loan reference identifier to adaptive payment server 120 along with the request for loan fund amount.

According to various implementations of the invention, adaptive payment server 120 may receive first identification information. In some implementations, first identification information may include, among other things, a credit card number, a debit card number, a name of the cardholder (such as a name of a borrower), a telephone number of the cardholder, a mailing address of the cardholder, and/or other information related to the lending transaction.

In some implementations, the first identification information may be received from a lender/loan provider server 104. In some implementations, the borrower may provide the first identification while applying for the loan (online, via a telephone call, and/or via other communication mechanisms). In some implementations, the borrower may provide the first identification information such as, for example, a payment card number by swiping the payment card at a magnetic swipe card reader provided at a lending store. In some implementations, the first identification information may be used to verify the identity of the borrower requesting loan funds. In some implementations, adaptive payment server 120 may receive the first identification information from loan provider server 104 associated with the lender via network 110.

According to various implementations of the invention, adaptive payment server 120 may receive second identification information. In some implementations, using the first identification information, adaptive payment server 120 may identify communication device 102. For example, in some implementations, the first identification information may include a telephone number of communication device 102, thereby identifying communication device 102. According to various implementations of the invention, adaptive payment server 120 may query database 140 to identify communication device 102 based on the first identification information.

In some implementations, adaptive payment server 120 may use or otherwise interface with IVR 150 in order to initiate a communication with communication device 102. IVR 150 may initiate a communication to communication device 102 via network 112. Once the communication is established, IVR 150 may prompt for and receive the second identification information from communication device 102.

According to various implementations of the invention, upon receipt of the second identification information, IVR 150 may use or otherwise be interfaced with HSM 160 to encrypt the second identification information. In some implementations, IVR 150 may store the second identification information and/or encrypted second identification information in database 140. In some implementations, HSM 160 may apply Triple Data Encryption Algorithm (commonly, "Triple DES") to encrypt the second identification information. As would be appreciated by those having skill in the art, other encryption algorithms may be utilized.

According to various implementations of the invention, examples of communication device 102 may include any one or more of, for instance, a personal computer, portable computer, personal digital assistant (PDA), workstation, web-enabled mobile telephone, WAP device, web-to-voice device, or other device. In other words, communication device 102 may include a data (or Internet) function configured to communicate data via network 112. In this manner, a borrower or other entity may use communication device 102 to apply for a loan and/or communicate the first identification information. The borrower is a person or other entity that is a payment cardholder, a user using the system to request/apply for a loan from a lender/loan provider server 104, and/or other person or entity using the system to process a lending transaction. Those having skill in the art will appreciate that the invention described herein may work with various system configurations.

For example, a borrower or other entity may use communication device 102 to input the first identification information (while filling out the loan application via the loan provider's website, during a telephone call to the lender and/or in response to other requests for first identification information via other communication mechanisms). According to various implementations of the invention, communication device 102 may store in a memory (not shown) the first identification information or otherwise facilitate retrieval of the first identification information, such as by storing web-enabled cookies that identify the borrower.

In some implementations, in addition to the first identification information, the borrower may use communication device 102 to enter borrower information (for example, name, address, telephone number, and/or other borrower information), the requested loan fund amount, and/or other information into a loan provider's website while applying for the loan. Loan provider server 104 may generate a loan reference identifier and communicate to communication device 102 a confirmation page that includes the loan reference identifier. The confirmation page may indicate to the borrower that details for the loan have been received by loan provider server 104 and that a telephone call should be expected for input of second identification information.

According to various implementations of the invention, adaptive payment server 120 may determine an account associated with the first identification information. In some implementations, the account may include a bank account, a credit and/or debit account, and/or other account associated with the borrower (hereinafter, "borrower account"). According to various implementations of the invention, adaptive payment server 120 may query database 140 to identify the borrower account based on the first identification information.

In some implementations, the borrower account may be associated with a payment card, which may include, among other things, a credit card, a debit card, and/or other device that may be used to facilitate a lending transaction. According to various implementations of the invention, the payment card may include a magnetic strip, a smart chip, near-field device, and/or other tangible media configured to store the first identification information and/or other information.

In some implementations, database 140, which may include information related to a borrower account, such as, for example, credit card numbers, debit card numbers, borrower contact information, borrower information, an identity of communication device 102 used by the borrower, and/or other information. In some implementations, database 140 may store the first identification information and the second identification information along with the borrower account information. In some implementations, database 140 may store the encrypted second identification information. In some implementations, the second identification information and/or the encrypted second identification information may be removed from database 140 when no longer needed in order to maintain security of the second identification information. In some implementations, database 140 may store the loan reference identifier for later retrieval by loan provider server 104, adaptive payment server 120, and/or IVR 150. According to various implementations of the invention, examples of database 140, include, for instance, a relational database, a filesystem, and/or other device or data representation configured for data storage.

According to various implementations of the invention, adaptive payment server 120 may identify communication device 102 based on the received first identification information. For example, the first identification information may include a telephone number input/provided by the borrower. According to various implementations of the invention, adaptive payment server 120 may identify communication device 102 by performing a lookup of database 140.

According to various implementations of the invention, adaptive payment server 120 may receive a payment card number and query database 140 to determine a telephone number of the borrower who owns a borrower account identified by the received payment card number. The lookup may be a structured query language (SQL) query, lightweight directory access protocol (LDAP) query, and/or any other known methods of querying database 140. In this manner, by storing an identifier (such as the telephone number in the preceding example) that identifies communication device 102 and the first communication information (such as the payment card number in the preceding example), system 100/adaptive payment server 120 may be configured to initiate a communication to communication device 102 using the first identification information.

In some implementations of the invention, the borrower may input the phone number into an interface such as a pinpad at the lending store or a website.

According to various implementations of the invention, adaptive payment server 120 may initiate a communication to communication device 102 in order to prompt for and receive the second identification information. For example, adaptive payment server 120 may initiate a telephone call to communication device 102 via the phone number determined or input as described above. Thus, communication device 102 may include a telephone (voice) function capable of receiving and/or sending telephone calls. Communication device 102 may include, for example, a PDA, smartphone, cellular telephone, cordless telephone, landline telephone, voice over IP (VOIP) telephone, any other device that includes a telephone function, and/or other device capable of receiving the communication.

According to various implementations of the invention, adaptive payment server 120 may initiate the telephone call via IVR 150. IVR 150 may include existing IVRs configured to initiate a telephone call a communication device that includes a telephone function (such as, for example, communication device 102), communicate information to a call recipient, interactively prompt the call recipient for input, receive the input (by touch-tone input, voice input, and/or other input mechanism), process the input, and/or perform other interactive voice functions.

According to various implementations of the invention, IVR 150 may initiate the communication to communication device 104 on a communication channel via network 112. Network 112 may be a Public Switch Telephone Network (PSTN), VOIP network, and/or other network or combination of networks that is configured for telephonic (voice) communication.

According to various implementations of the invention, upon establishing a communication channel, IVR 150 may greet the call recipient with a greeting that identifies the nature of the telephone call. The greeting may allow the call recipient to verify the trustworthiness of the call. According to various implementations of the invention, the greeting may include, for example, an identification of IVR 150, borrower information, loan reference identifier, and/or other verification information to the call recipient. The verification information may include, among other things, any combination of one or more of predefined words, letters, characters, numbers, verbal utterance by the borrower, and/or other predefined verification information that allows the call recipient to verify the trustworthiness of the call.

According to various implementations of the invention, IVR 150 may prompt for and receive the second identification information from communication device 102. The second identification information may include, among other things, a predefined secret. The predefined secret may include, for example, a password, PIN, and/or other secret.

According to various implementations of the invention, once the communication is established, the greeting described above with regard to IVR 150 may be presented to the borrower through communication device 102. At least a portion of the borrower account information may be communicated to communication device 102, which may allow the borrower to identify the lending transaction. For example, a borrower account identifier, loan reference identifier, and/or requested loan fund amount may be communicated to communication device 102. Furthermore, according to various implementations of the invention, the verification information described above may be communicated to communication device 102. According to various implementations of the invention, the verification information may include the verbal utterance described above. In this manner, the borrower receiving the communication via communication device 102 may verify the trustworthiness of the communication.

According to various implementations of the invention, adaptive payment server 120 may authenticate identification of the borrower account based on the second identification information. In other words, based on the received second identification information (e.g., PIN information), adaptive payment server 120 may ensure that the borrower account belongs to the borrower. In some implementations, adaptive payment server 120 may communicate with the borrower's bank to verify that the second identification information is associated with the borrower account. In some implementations, adaptive payment server 120 may query database 140 to retrieve the second identification information stored therein and compare the stored second identification information with the received second identification information. In other words, database 140 may have the second identification information stored therein (prior to receiving information from the borrower via IVR 150) which may be compared to the second identification information received via IVR 150. In response to a match, adaptive payment server 120 may determine that the borrower account belongs to the borrower (i.e., identify the borrower account as being authentic).

In some implementations, a borrower may visit a payday lending store and may apply for a pay day loan or request a payday loan fund from the payday lender. The borrower may swipe his/her payment card at the store. The payment card number (i.e., first identification information) may be provided to the payday lender/loan provider server 104. The payday lender/loan provider server 104 may provide a request for a loan fund amount associated with the requested loan fund and the payment card number to adaptive payment server 120. Using the payment card number, adaptive payment server 120 may access a phone number associated with the borrower (by querying database 140, for example). Adaptive payment server 120 may initiate a call the borrower; prompt the borrower for the PIN number (i.e., second identification information); and authenticate the identification of a borrower account based on the received PIN number.

According to various implementations of the invention, adaptive payment server 120 may initiate a deposit of the requested loan fund amount into the identified borrower account. In some implementations, the requested loan fund amount may be deposited substantially immediately after the identified borrower account has been authenticated.

In some implementations, adaptive payment server 120 may include a processor 130, a memory 125, and/or other components that facilitate the functions of adaptive payment server 120. In some implementations, processor 130 includes one or more processors configured to perform various functions of adaptive payment server 120. In some implementations, memory 125 includes one or more tangible (i.e., non-transitory) computer readable media. Memory 125 may include one or more instructions that when executed by processor 130 configure processor 130 to perform functions of adaptive payment server 120. In some implementations, memory 116 may include one or more instructions stored on tangible computer readable media that when executed at a remote device, such as communication device 102, cause the remote device to facilitate interaction with adaptive payment server, as described herein.

In some implementations, loan provider server 104 may include a processor 106, a memory 108, and/or other components that facilitate the functions of loan provider server 104. In some implementations, processor 106 includes one or more processors configured to perform various functions of loan provider server 104. In some implementations, memory 108 includes one or more tangible (i.e., non-transitory) computer readable media. Memory 108 may include one or more instructions that when executed by processor 106 configure processor 106 to perform functions of loan provider server 104. In some implementations, memory 108 may include one or more instructions stored on tangible computer readable media that when executed at a remote device, such as communication device 102, cause the remote device to facilitate interaction with loan provider server, as described herein.

Figure 2:
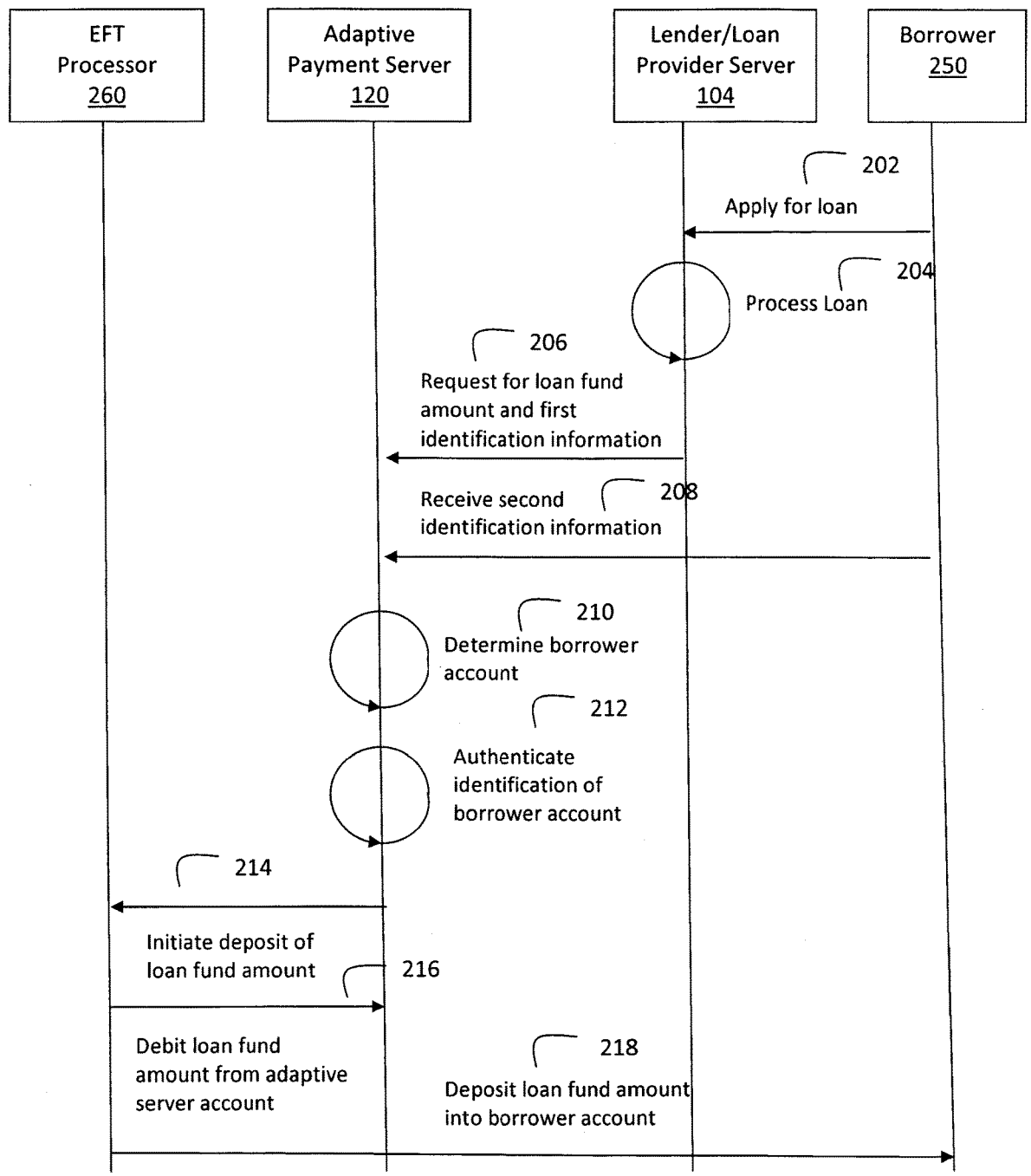
FIG. 2 is a data flow diagram illustrating process relationships in a system for processing lending transactions, according to various implementations of the invention.

FIG. 2 is a data flow diagram illustrating process relationships in a system for processing lending transactions, according to various implementations of the invention. Borrower 250 may apply for a loan (i.e., request a loan) in operation 202. In some implementations, borrower 250 may apply for the loan via a website associated with lender/loan provider server 104 or other website. In some implementations, borrower 250 may apply for the loan by calling the lender 104. In some implementations, loan provider server 104 may receive the request for the loan from borrower 250 via communication device 102, for example. For example, borrower 250 may utilize communication device 102 to fill out a loan application associated with loan provider server 104. In some implementations, borrower 250 may utilize communication device 102 to call a lender and apply for the loan over the phone.

In some implementations, loan provider server 104 may process the loan, in operation 204. In some implementations, loan provider server 104 may determine whether to approve the loan. In response to a determination that the loan is approved, loan provider server 104 may send a request for a loan fund amount associated with the loan to adaptive payment server 120, in operation 206.

In some implementations, adaptive payment server 120 may receive first identification information from lender/loan provider server 104, in operation 206. In some implementations, adaptive payment server 120 may receive second identification information from borrower 250. In some implementations, adaptive payment server 120 may initiate a communication to communication device 102 associated with borrower 250 (such as via IVR 150 or other communication channel separate from the channel in which the first identification information was received) in order to prompt for and receive the second identification information.

In some implementations, in an operation 210, adaptive payment server 120 may determine a borrower account associated with the borrower based on the received first identification information. In some implementations, adaptive payment server 120 may authenticate the identified borrower account, in operation 212. In some implementations, adaptive payment server 120 may authenticate the identified borrower account based on the received second identification information.

In some implementations, adaptive payment server 120 may initiate deposit of the loan fund amount, in operation 214. In some implementations, adaptive payment server 120 may provide a request to initiate the deposit to EFT (Electronic Funds Transfer) processor 260. EFT processor 260 may cause a deposit of the loan fund amount into borrower account, in operation 218.

In some implementations, EFT processor 260 may debit the loan fund amount from a settlement account associated with the adaptive payment server (hereinafter, "adaptive server account"), in operation 216. In some implementations, EFT processor 260 may credit (e.g., cause a deposit of) the loan fund amount to the borrower account, in operation 218. In some implementations, EFT processor 260 may receive borrower account information and adaptive server account information from adaptive payment server 120. EFT processor 260 may then perform the transfer of the loan fund amount from adaptive server account to the borrower account.

Figure 3:
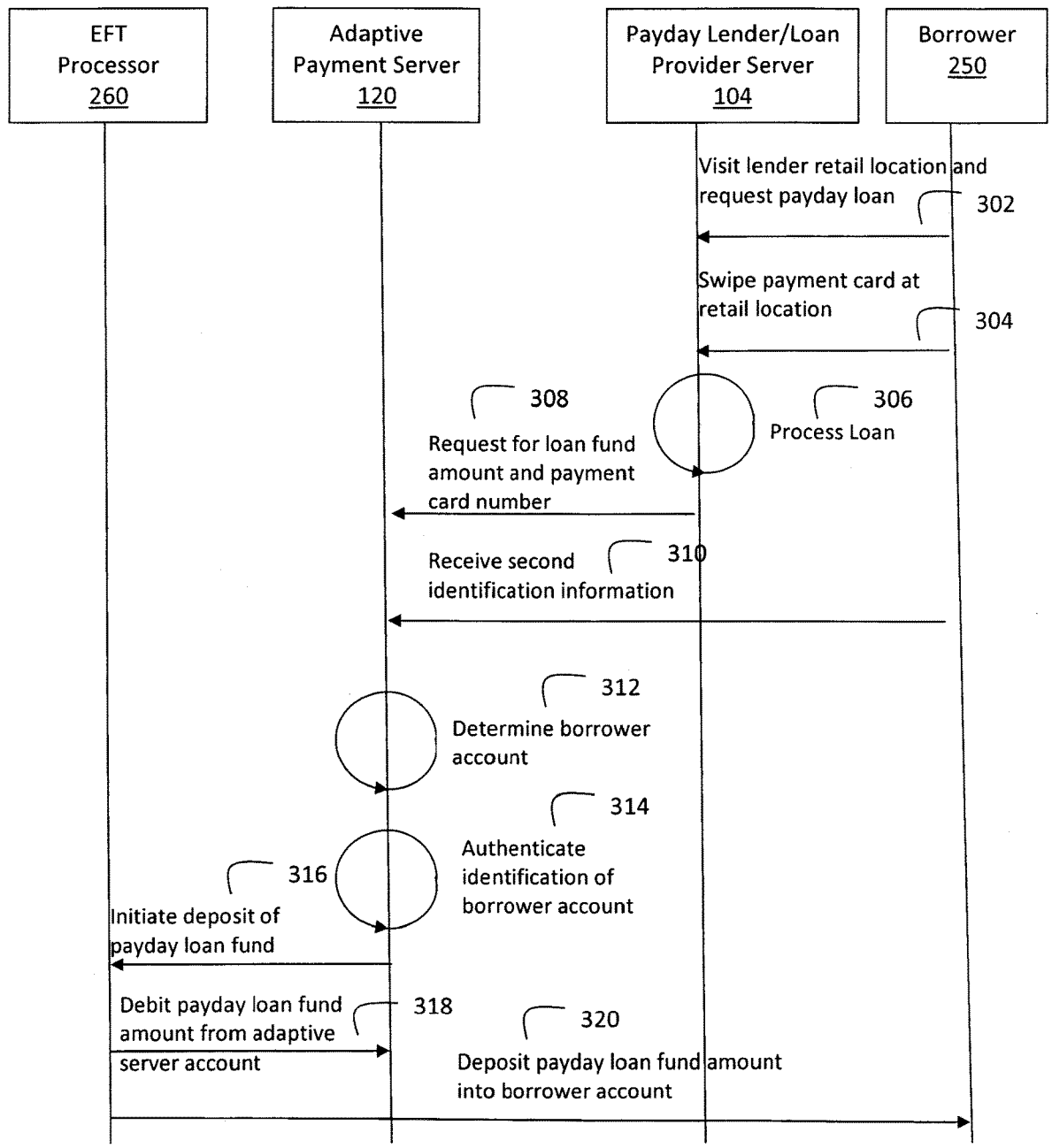
FIG. 3 is a data flow diagram illustrating process relationships in a system for processing payday lending transactions, according to various implementations of the invention.

FIG. 3 is a data flow diagram illustrating process relationships in a system for processing payday lending transactions, according to various implementations of the invention. Borrower 250 may visit payday lending store and request/apply for a payday loan, in operation 302. In some implementations, borrower 250 may swipe a payment card at the payday lending store, in operation 304. As would be appreciated, borrower 250 may input account information in a different manner at the payday lending store such as by manually inputting the information into a keypad, using near-field devices, or using a smart chip. In some implementations, loan provider server 104 may receive the payment card number associated with the payment card or otherwise receive the obtained financial account identifier during operation 304.

In some implementations, payday lender/loan provider server 104 may process the payday loan in operation 306. In some implementations, loan provider server 104 may determine whether to approve the payday loan. In response to a determination that the payday loan is approved, loan provider server 104 may send a request for a payday loan fund amount associated with the payday loan to adaptive payment server 120, in operation 308. In some implementations, adaptive payment server 120 may receive the payment card number or other account identifier from loan provider server 104, in operation 308.

In some implementations, in operation 310, adaptive payment server 120 may receive second identification information from borrower 250. In some implementations, adaptive payment server 120 may initiate a communication to communication device 102 associated with borrower 250 (such as via IVR 150) in order to prompt for and receive the second identification information.

In an operation 312, adaptive payment server 120 may determine a borrower account based on the received payment card number. In some implementations, adaptive payment server 120 may query database 140 to determine the borrower account. In some implementations, adaptive payment server 120 may authenticate the identification of the borrower account based on the received second identification information, in operation 314.

In some implementations, adaptive payment server 120 may initiate a deposit of the payday loan fund amount to the identified borrower account, in operation 316. In some implementations, adaptive payment server 120 may provide a request to initiate the deposit to EFT (Electronic Funds Transfer) processor 260. EFT processor 260 may deposit the payday loan fund amount into borrower account, in operation 320.

In some implementations, EFT processor 260 may debit the payday loan fund amount from the adaptive server account, in operation 318. In some implementations, EFT processor 260 may credit the payday loan fund amount to the borrower account, in operation 320. In some implementations, EFT processor 260 may receive borrower account information and adaptive server account information from adaptive payment server 120. EFT processor 260 may then perform the transfer of the payday loan fund amount from adaptive server account to the borrower account.

Figure 4:
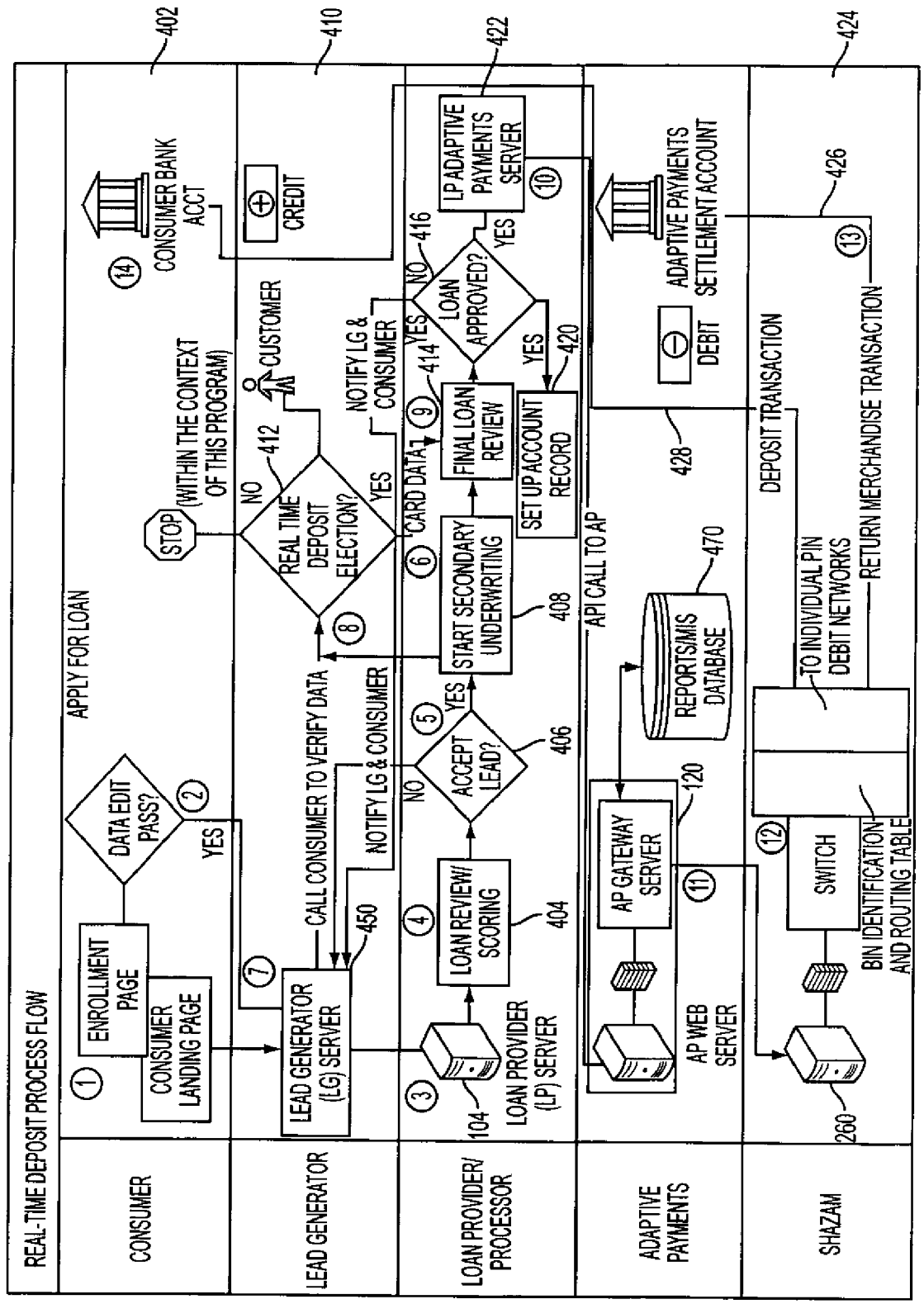
FIG. 4 is a diagram illustrating an example flow of data among various entities involved in a real-time deposit of loan funds associated with a lending transaction, according to various implementations of the invention.

FIG. 4 is a diagram illustrating an example flow of data among various entities involved in a real-time deposit of loan funds associated with a lending transaction, according to various implementations of the invention.

In some implementations, in operation 402, a consumer (i.e., borrower) may apply for a loan such as online via a website associated with loan provider server 104. The borrower may fill out a loan application via an enrollment page of the website. In some implementations, loan provider server 104 may host the website. In some implementations, the borrower may access the website via communication device 102. In some implementations, the borrower may provide the payment card number (i.e., first identification information) via the loan application. In some implementations, the borrower may apply for the loan prior to visiting a lender (e.g., payday lending store).

In some implementations, the loan application may be received by lead generator server 450. Lead generator server 450 may perform one or more lead processing operations associated with the loan application. The one or more lead processing operations may include, among other things, initiating a call to the consumer to verify the data entered in the loan application (operation 410), determining whether the consumer has elected real-time deposit for the requested loan funds (operation 412), and/or other operations. In response to a determination that the consumer has elected real-time deposit, lead generator server 450 may notify loan provider server 104 of the election.

In some implementations, loan provider server 104 may receive the loan application from lead generator server 450 or directly from the consumer (via the website). Loan provider server 104 may perform one or more loan processing operations associated with the loan application. In some implementations, loan provider server 104 may review and/or score the loan application, in operation 404. In some implementations, loan provider server 104 may determine whether to accept the lead, in operation 406. In response to a determination that the lead is to be accepted, loan provider server 104 may initiate a secondary underwriting operation 408. In response to a determination that the lead is not to be accepted, loan provider server 104 may notify lead generator server 450 and borrower of the result. In some implementations, loan provider server 104 may perform a final review of the loan application, in operation 414. In some implementations, loan provider server 104 may determine whether the requested loan is approved, in operation 416. In response to a determination that the loan is approved, loan provider server 104 may set up an account record (operation 220), may notify lead generator server 450 and consumer of the loan approval and may communicate the loan information (including, but not limited to, loan application details, results of loan review, loan approval information, request for loan fund amount, first identification information, and/or other information collected by lender/loan provider server 104 etc.) to adaptive payment server 120 (operation 422). In some implementations, the account record may include credentials for a returning approved customer to log in and apply for the next loan. In some implementations, loan provider server 104 may communicate the loan information to adaptive payment server 120 via an application programming interface (API) call to adaptive payment server 120. In some implementations, in response to a determination that the loan is not approved, loan provider server 104 may notify lead generator server 450 and the consumer of the loan disapproval.

In some implementations, adaptive payment server 120 may perform one or more operations associated with initiating a deposit of the requested loan fund amount. In some implementations, adaptive payment server 120 may receive a request for a loan fund amount, first identification information, and second identification information, may determine an account associated with the first identification information, may authenticate identification of the account based on the second identification information, may initiate a deposit of the requested loan fund amount, and/or perform other operations, as described herein.

In some implementations, adaptive payment server 120 may provide a request to initiate the funds transfer (i.e., of requested loan fund amount) to an Electronic Funds Transfer (EFT) processor 260, in operation 424. EFT processor 260 may perform EFT transactions involving funds transfer via EFT messages. The EFT messages could be in the form of ISO 8583 payment messages supported by various EFT networks. Each network adapts the ISO 8583 standard for its own use with custom fields and custom usages. The placement of fields in different versions such as 1987, 1993 and 2003 of the standard varies. Also, one EFT network may act as a gateway to other EFT networks to provide universal coverage.

In some implementations, EFT processor 260 may debit the loan fund amount from the adaptive server account, in operation 426. In some implementations, EFT processor 260 may credit the loan fund amount to the borrower account, in operation 428.

In some implementations, EFT processor 260 may perform a debit transaction associated with the adaptive server account. In some implementations, the debit transaction may comprise a return merchandise transaction which serves as a precursor to a real-time credit transaction associated with the borrower account.

In some implementations, EFT processor 260 may receive the borrower account information (including, for example, borrower account number, PIN number, etc.) and adaptive server account information (including, for example, adaptive server account number, etc.) from adaptive payment server 120. In some implementations, EFT processor 260 may perform the debit and credit transactions via PIN debit networks.

In some implementations, EFT processor 260 may generate a receipt for the borrower. The receipt may include, among other information, an amount of fund transfer (i.e., loan fund amount credited to borrower account), date the transfer was credited to the borrower account, the type of transfer and type of borrower account (i.e., checking, savings, or other account) to which funds were transferred, the name of third party (i.e., lender) from whom funds were transferred, borrower account number, and/or any fees assessed against the borrower account for the fund transfer. In some implementations, EFT processor 260 may communicate the receipt to communication device 102 via email, text messages, or other communication mechanisms. The borrower may view the receipt via communication device 120.

Figure 5:
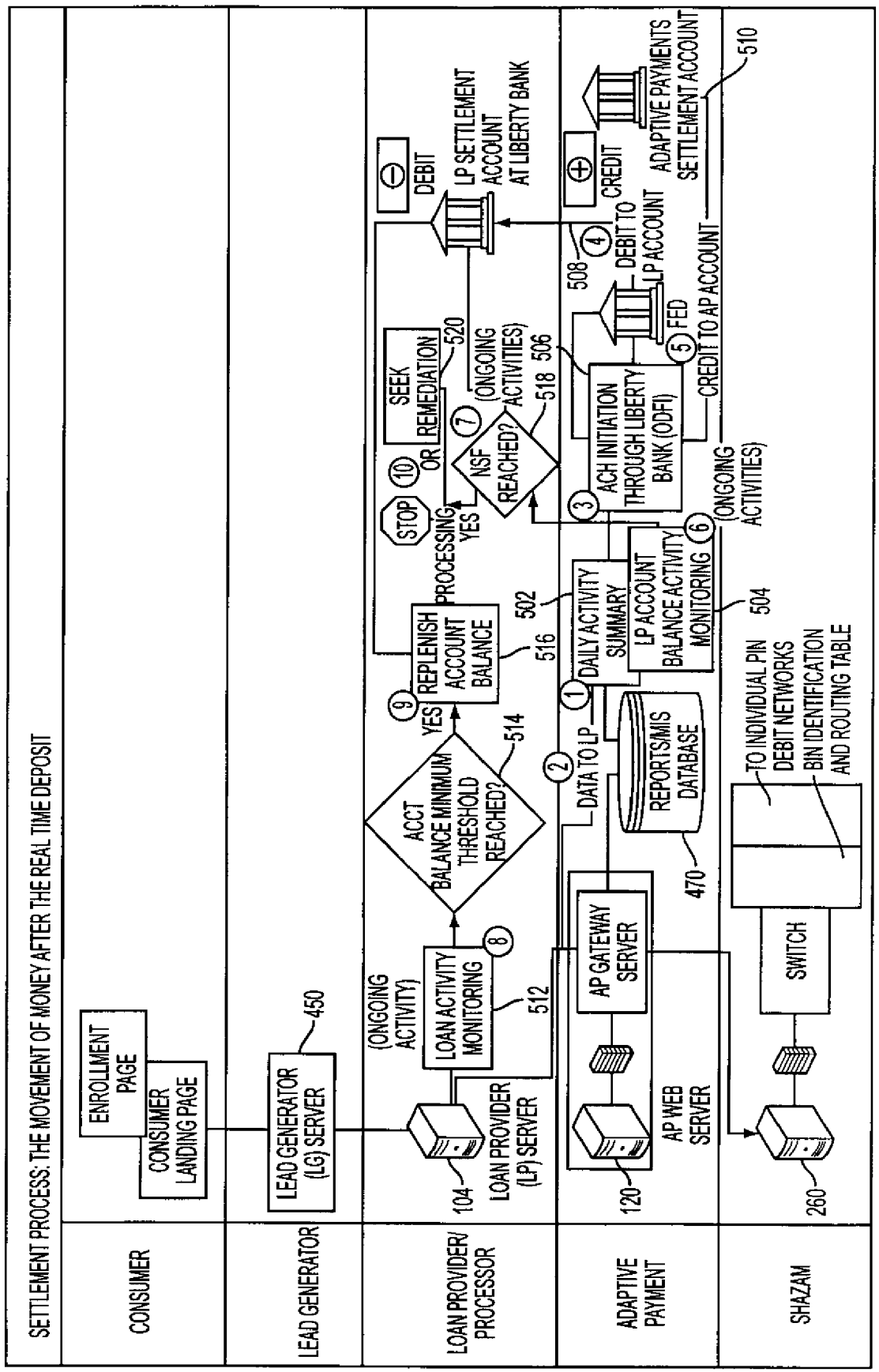
FIG. 5 is a diagram illustrating an example flow of data among various entities involved in a settlement of the lending transaction, according to various implementations of the invention.

FIG. 5 is a data flow diagram illustrating an example flow of data among various entities involved in a settlement of the lending transaction, according to various implementations of the invention.

In some implementations, adaptive payment server 120 may perform one or more settlement processing operations. In some implementations, adaptive payment server 120 may generate a summary of daily loan activity associated with the adaptive server account and may provide the summary to loan provider server 104, in operation 502. The summary may be in the form of one or more reports and may be stored in a reports/MIS (management information system) database 470.

In some implementations, adaptive payment server 120 may monitor the activity of a settlement account associated with the lender/loan provider server 104 (referred to hereinafter as "LP account"), in operation 504.

In some implementations, adaptive payment server 120 may initiate one or more automated clearing house transactions (operation 506) which may include one or more debit transactions associated with the LP account (operation 508), one or more credit transactions associated with the adaptive server account (operation 510), and/or other transactions. In some implementations, adaptive payment server 120 may perform the debit transaction(s) to cover the daily loan activity associated with the adaptive server account. In some implementations, adaptive payment server may debit funds from LP account and may credit the debited funds to the adaptive server account.

In some implementations, the LP account may be pre-funded by the loan provider. In other words, the lender/loan provider server 104 may deposit certain amounts to LP account to cover daily loan activity. In some implementations, the LP account may be pre-funded to cover at least three days of loan activity. In some implementations, the LP account may be pre-funded with additional amounts to cover loan activity occurring during weekends and holidays.

In some implementations, loan provider server 104 may monitor loan activity associated with the LP account, in operation 512. In some implementations, loan provider server 104 may monitor the balance of the pre-funded amount in the LP account to ensure that there are sufficient funds to cover loan activity. In some implementations, loan provider server 104 may determine whether an account balance minimum threshold has been reached for the LP account, in operation 514. In response to a determination that the account balance minimum threshold has been reached, loan provider server 104 may replenish the LP account balance, in operation 516.

In some implementations, adaptive payment server 120 may determine whether a non-sufficient funds indication associated with the LP account has been reached, in operation 518. In response to a determination that a non-sufficient funds indication has been reached, adaptive payment server 120 may stop initiating loan fund amount deposits to borrower accounts on behalf of the lender/loan provider server associated with the LP account. In response to a determination that a non-sufficient funds indication has not been reached, adaptive payment server 120 may continue with the debit transaction associated with the LP account.

Although system 100 has been described with a single communication device, according to various implementations of the invention, system 100 may be configured to operate using a number of communication devices (not shown). According to various implementations of the invention, a first communication device may include a data function and a second communication device may include a telephone function. In this example, the first communication device may transmit first identification information over the Internet using its Internet function and the second communication device may be called by IVR 150 to communicate second identification information using its telephone function.

Although communication device 102 in examples described herein is described as including Internet and telephone functions, according to various implementations of the invention, communication device 102 may include other combinations of communication functions. For example, SMS messaging functions may be used to communicate the first identification information and/or the second identification information. According to various implementations of the invention, adaptive payment server 120 may initiate communication via SMS message to communication device 102 in order to prompt for and receive the second identification information. According to various implementations of the invention, a borrower may input the first identification information via a telephone (such as when applying for a loan via telephone) and also be called on the same or different telephone to input the second identification information. According to various implementations of the invention, the borrower may use a payment card at a brick-and-mortar establishment (such as, for example, by sliding the payment card through an existing card reader), whereupon adaptive payment server 120 may initiate a communication for input of the second identification information (such as, for example, by calling the borrower for PIN input).

Although system 100 has been described with one lender/loan provider server and an LP account associated therewith, according to various implementations of the invention, system 100 may be configured to operate using a number of lenders/servers and an LP account associated with each lender/server. As such, the various operations described above (in FIGS. 2-5, for example) with respect to lender/server 104, and LP account may be performed and/or associated with a number of lenders/servers and the respective LP accounts. For example, each lender of a number of lenders may pre-fund a respective LP account and adaptive payment server 120 may perform debit transaction(s) associated with the respective LP account to cover loan activity associated with the respective lender/server.

In some implementations, adaptive payment server 140 may include an adaptive payment web server and an adaptive payment gateway server. The adaptive payment web server may host the website via which a borrower may apply for a loan by filing out a loan application, for example.

Figure 6:
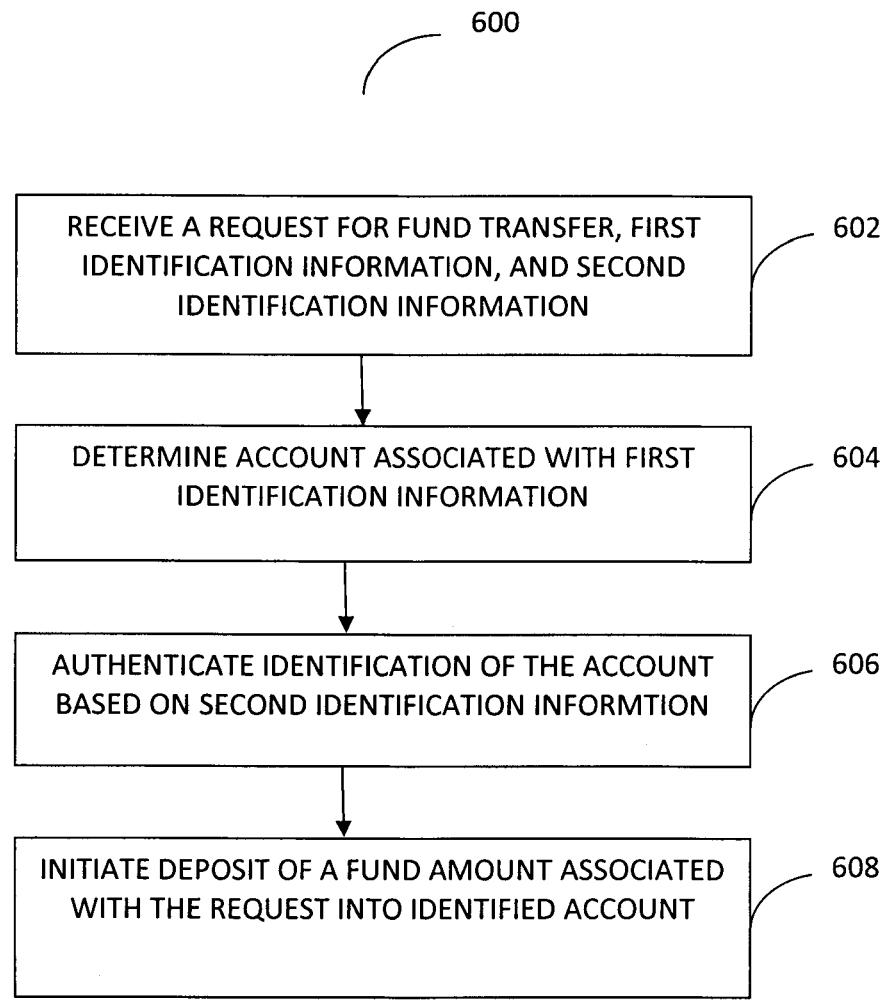
FIG. 6 is a flow diagram illustrating an example of a process of processing a fund transfer transaction, according to various implementations of the invention.

FIG. 6 is a flow diagram illustrating an example process 600 of processing a fund transfer transaction according to various implementations of the invention. The various processing operations depicted in the flow diagram of FIG. 6 (and in the other drawing figures) are described in greater detail herein. The described operations for a flow diagram may be accomplished using some or all of the system components described in detail above and, in some implementations, various operations may be performed in different sequences. In some implementations, additional operations may be performed along with some or all of the operations shown in the depicted flow diagrams. In yet other implementations, one or more operations may be performed simultaneously. Accordingly, the operations as illustrated (and described in greater detail below) are examples by nature and, as such, should not be viewed as limiting.

According to various implementations of the invention, in an operation 602, process 600 may receive a request for a fund transfer, first identification information and second identification information. In some implementations, first identification information may include, among other things, a credit card number, a debit card number, a name of the cardholder (such as a name of a requester), a telephone number of the cardholder, a mailing address of the cardholder, and/or other information related to the fund transfer transaction. In some implementations, process 600 may receive the request for a fund transfer and the first identification information from a fund provider/fund processing server 104.

In some implementations, process 600 may identify a communication device (for example, communication device 102) based on the first identification information. In some implementations, process 600 may initiate a communication to the communication device 102. In some implementations, process 600 may receive the second identification information from the communication device.

In operation 604, process 600 may determine an account (for example, requester account) associated with the first identification information. In operation 606, process 600 may authenticate identification of the account based on the second identification information. In other words, based on the received second identification information (e.g., PIN information), process 600 may ensure that the requester account belongs to the requester.

In operation 608, process 600 may initiate a deposit of a fund amount associated with the request into the identified account. In some implementations, the fund amount may be deposited substantially immediately after the identified account has been authenticated.

Figure 7:
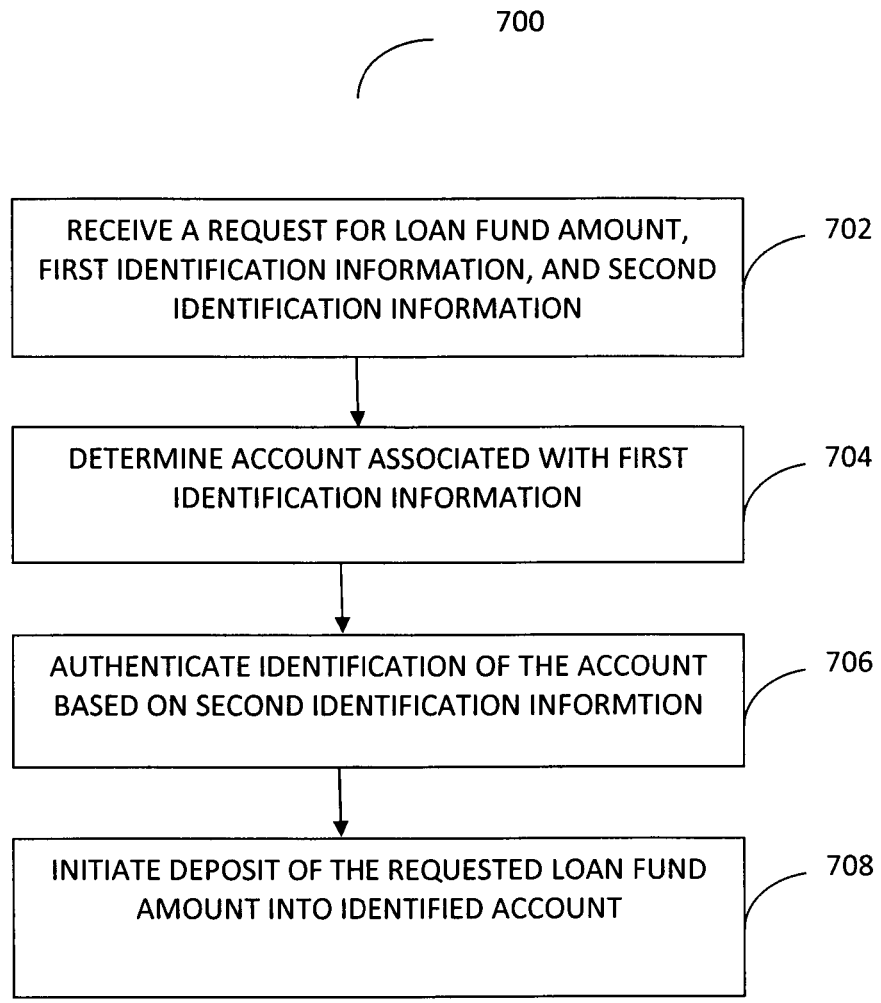
FIG. 7 is a flow diagram illustrating an example of a process of processing a lending transaction, according to various implementations of the invention.

FIG. 7 is a flow diagram illustrating an example process 700 of processing a lending transaction according to various implementations of the invention. The various processing operations depicted in the flow diagram of FIG. 7 (and in the other drawing figures) are described in greater detail herein. The described operations for a flow diagram may be accomplished using some or all of the system components described in detail above and, in some implementations, various operations may be performed in different sequences. In some implementations, additional operations may be performed along with some or all of the operations shown in the depicted flow diagrams. In yet other implementations, one or more operations may be performed simultaneously. Accordingly, the operations as illustrated (and described in greater detail below) are examples by nature and, as such, should not be viewed as limiting.

According to various implementations of the invention, in an operation 702, process 700 may receive a request for a loan fund amount, first identification information and second identification information. In some implementations, first identification information may include, among other things, a credit card number, a debit card number, a name of the cardholder (such as a name of a borrower), a telephone number of the cardholder, a mailing address of the cardholder, and/or other information related to the lending transaction. In some implementations, process 700 may receive the request for a loan fund amount and the first identification information from a loan provider/server 104.

In some implementations, process 700 may identify a communication device (for example, communication device 102) based on the first identification information. In some implementations, process 700 may initiate a communication to the communication device 102. In some implementations, process 700 may receive the second identification information from the communication device.

In operation 704, process 700 may determine an account (for example, borrower account) associated with the first identification information. In operation 706, process 700 may authenticate identification of the account based on the second identification information. In other words, based on the received second identification information (e.g., PIN information), process 700 may ensure that the borrower account belongs to the borrower.

In operation 708, process 700 may initiate a deposit of the requested loan fund amount into the identified account. In some implementations, the requested loan fund amount may be deposited substantially immediately after the identified account has been authenticated.

Implementations of the invention may be made in hardware, firmware, software, or any suitable combination thereof. Implementations of the invention may also be implemented as instructions stored on a machine-readable medium, which may be read and executed by one or more processors. A tangible machine-readable medium may include any mechanism for storing or transmitting information in a form readable by a machine (e.g., a computing device). For example, a tangible machine-readable storage medium may include read only memory, random access memory, magnetic disk storage media, optical storage media, flash memory devices, and other tangible storage media. Intangible machine-readable transmission media may include intangible forms of propagated signals, such as carrier waves, infrared signals, digital signals, and other intangible transmission media. Further, firmware, software, routines, or instructions may be described in the above disclosure in terms of specific exemplary implementations of the invention, and performing certain actions. However, it will be apparent that such descriptions are merely for convenience and that such actions in fact result from computing devices, processors, controllers, or other devices executing the firmware, software, routines, or instructions.

Implementations of the invention may be described as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other implementations, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

What is claimed is:

1. A method of processing a funds transfer transaction from a funds provider to a requestor, comprising:
   receiving, by an adaptive payment server and from a server of the funds provider, first identification information of the requestor, a request for a fund transfer, and a funds amount, wherein the first identification information comprises a debit card number, wherein the adaptive payment server comprises one or more processors;
   determining, by the adaptive payment server, an account of the requestor associated with the first identification information;
   identifying, by the adaptive payment server, a communication device of the requester based on the first identification information;
   initiating, by the adaptive payment server, a communication to the communication device to request second identification information from the requester, wherein the second identification information comprises a Personal Identification Number (PIN);
   receiving, by the adaptive payment server, the PIN from the requestor via the communication device;
   authenticating, by the adaptive payment server, the account of the requestor with the PIN; and
   initiating, by the adaptive payment server and to an electronic funds transfer (EFT) processor, a transfer of the funds amount associated with the requested fund transfer from the funds provider into the account of the requestor, wherein the EFT processor causes the funds amount to be transferred substantially immediately into the account of the requestor after the transfer of the funds amount has been initiated.

2. The method of claim 1, wherein the communication device includes a telephone function, and wherein the communication device is identified by a telephone number, and wherein the telephone number is determined based on the first identification information.

3. The method of claim 1, wherein said initiating a communication further comprises:
   calling, by an interactive voice response (IVR) system associated with the adaptive payment server, the communication device using the telephone number; and
   prompting, through the communication device, input of the second identification information.

4. A system of processing a funds transfer transaction from a funds provider to a requestor, comprising:
   an adaptive payment server comprising one or more processors configured to:
      receive, from a server of the funds provider, first identification information of the requestor, a request for a fund transfer, and a funds amounts, wherein the first identification information comprises a debit card number, wherein the adaptive payment server comprises one or more processors;
      determine an account of the requestor associated with the first identification information;
      identify a communication device of the requestor based on the first identification information;
      initiate a communication to the communication device to request second identification information from the requester, wherein the second identification information comprises a Personal Identification Number (PIN);
      receive the PIN from the requestor via the communication device;
      authenticate the account of the requestor with the PIN; and
      initiate, to an electronic funds transfer (EFT) processor, a transfer of the funds amount associated with the requested fund transfer from the funds provider into the account of the requestor, wherein the EFT processor causes the funds amount to be deposited substantially immediately into the account of the requestor after the transfer of the funds amount has been initiated.

5. The system of claim 4, wherein the communication device includes a telephone function, and wherein the communication device is identified by a telephone number, and wherein the telephone number is determined based on the first identification information.

6. The system of claim 4, wherein said initiate a communication further comprises:
   call, by an interactive voice response (IVR) system associated with the adaptive payment server, the communication device using the telephone number; and
   prompt, through the communication device, input of the second identification information.

* * * * *